(12) United States Patent
Hung et al.

(10) Patent No.: US 11,740,428 B2
(45) Date of Patent: Aug. 29, 2023

(54) OPTICAL ELEMENT DRIVING MECHANISM

(71) Applicant: TDK TAIWAN CORP., Taoyuan (TW)

(72) Inventors: Shih-Wei Hung, Taoyuan (TW); Sheng-Zong Chen, Taoyuan (TW); Ko-Lun Chao, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 17/707,019

(22) Filed: Mar. 29, 2022

(65) Prior Publication Data

US 2022/0308421 A1    Sep. 29, 2022

Related U.S. Application Data

(60) Provisional application No. 63/167,300, filed on Mar. 29, 2021.

(51) Int. Cl.
| | |
|---|---|
| G03B 11/04 | (2021.01) |
| G02B 7/08 | (2021.01) |
| G02B 27/64 | (2006.01) |
| H01F 7/02 | (2006.01) |
| G02B 7/04 | (2021.01) |
| H01F 7/08 | (2006.01) |

(52) U.S. Cl.
CPC .................. *G02B 7/08* (2013.01); *G02B 7/04* (2013.01); *G02B 27/646* (2013.01); *G03B 11/043* (2013.01); *H01F 7/02* (2013.01); *H01F 7/081* (2013.01)

(58) Field of Classification Search
CPC ........... G03B 11/043; G03B 9/36; G03B 7/01
See application file for complete search history.

(56) References Cited

U.S. PATENT DOCUMENTS

| | | | |
|---|---|---|---|
| 2007/0122144 A1* | 5/2007 | Han | H04N 5/2251 |
| | | | 348/E5.025 |
| 2020/0249415 A1* | 8/2020 | Wang | G03B 30/00 |
| 2022/0091478 A1* | 3/2022 | Sawanobori | G06F 1/1686 |
| 2022/0091479 A1* | 3/2022 | Sawanobori | G03B 11/043 |
| 2022/0120997 A1* | 4/2022 | Wang | G02B 7/005 |
| 2022/0121025 A1* | 4/2022 | Wang | G02B 7/006 |
| 2022/0121086 A1* | 4/2022 | Wang | G03B 9/02 |

FOREIGN PATENT DOCUMENTS

CN             215986657 U    3/2022

* cited by examiner

*Primary Examiner* — Clayton E. LaBalle
*Assistant Examiner* — Diana Hancock
(74) *Attorney, Agent, or Firm* — Muncy, Geissler, Olds & Lowe, P.C.

(57) ABSTRACT

The present disclosure provides an optical element driving mechanism, which includes a movable part, a fixed assembly, and a driving assembly. The movable part is configured to be connected to an optical element. The fixed assembly has a first opening, and the movable part is movable relative to the fixed assembly along a first axis. The driving assembly is configured to drive the movable part to move between a first position and a second position relative to the fixed assembly, so that the optical element selectively overlaps the first opening.

19 Claims, 13 Drawing Sheets

OPTICAL ELEMENT DRIVING MECHANISM

CROSS REFERENCE TO RELATED APPLICATIONS

This application claims the benefit of U.S. Provisional Application No. 63/167,300, filed on Mar. 29, 2021, the entirety of which is incorporated by reference herein.

BACKGROUND OF THE DISCLOSURE

Field of the Disclosure

The present disclosure relates to an optical element driving mechanism, and in particular it relates to an optical element driving mechanism with a shutter structure.

Description of the Related Art

As technology has developed, it has become more common to include image-capturing and video-recording functions into many types of modem electronic devices, such as smartphones and digital cameras. These electronic devices are used more and more often, and new models have been developed that are convenient, thin, and lightweight, offering more choices for consumers.

BRIEF SUMMARY OF THE DISCLOSURE

According to some embodiments of the disclosure, the present disclosure provides an optical element driving mechanism, which includes a movable part, a fixed assembly, and a driving assembly. The movable part is configured to be connected to an optical element. The fixed assembly has a first opening, and the movable part is movable relative to the fixed assembly along a first axis. The driving assembly is configured to drive the movable part to move between a first position and a second position relative to the fixed assembly, so that the optical element selectively overlaps the first opening.

According to some embodiments, the optical element driving mechanism further includes a first circuit assembly configured to be electrically connected to an external control circuit. The movable part has a magnetically conductive material and includes an electrical conductive member. When the movable part is located in the first position relative to the fixed assembly, the electrical conductive member is configured to be electrically connected to the first circuit assembly, so that the external control circuit determines that the movable part is located in the first position.

According to some embodiments, the optical element driving mechanism further includes a second circuit assembly configured to be electrically connected to the external control circuit. When the movable part is located in the second position relative to the fixed assembly, the electrical conductive member is configured to be electrically connected to the second circuit assembly, so that the external control circuit determines that the movable part is located in the second position.

According to some embodiments, the electrical conductive portion includes a base portion, two side portions and a cantilever section, each of which has a plate-shaped structure. The two side portions are connected to opposite sides of the base portion. An extending direction of the two side portions is different from an extending direction of the base portion. The base portion is connected to a main body of the movable part by the cantilever section. The main body and the electrical conductive member are integrally formed as one piece.

According to some embodiments, when viewed along a second axis perpendicular to the first axis, an angle between the side portion and the base portion is greater than 90 degrees. When viewed along the first axis, the angle between the main body and the cantilever section is greater than 90 degrees.

According to some embodiments, the first circuit assembly includes a first circuit member and a second circuit member, which have a metal material. When the movable part is located in the first position, the two side portions are respectively in contact with the first circuit member and the second circuit member.

According to some embodiments, the second circuit assembly includes a third circuit member and a fourth circuit member, which have a metal material. When the movable part is located in the second position, the two side portions are respectively in contact with the third circuit member and the fourth circuit member. The second circuit member is electrically connected to the third circuit member.

According to some embodiments, the main body includes a front side portion, a middle portion and a rear side portion. The middle portion is connected between the front side portion and the rear side portion. The front side portion has two clamping structures configured to clamp the optical element.

According to some embodiments, there is a stage difference between the front side portion and the middle portion. The shortest distance between the front side portion and the fixed assembly is greater than the shortest distance between the middle portion and the fixed assembly.

According to some embodiments, the extending direction of the rear side portion is different from the extending direction of the middle portion. When viewed along the second axis, the angle between the rear side portion and the middle portion is between 85 degrees and 95 degrees. The driving assembly includes a magnetic element which is affixed to the middle portion and the rear side portion.

According to some embodiments, the fixed assembly includes a base. The optical element driving mechanism further includes a third circuit assembly configured to be electrically connected to the driving assembly. A part of the first circuit assembly, the second circuit assembly and the third circuit assembly is disposed in the base. The third circuit assembly is electrically independent of the first circuit assembly and the second circuit assembly.

According to some embodiments, the first circuit assembly and the second circuit assembly are disposed on a first side of the base. The third circuit assembly is disposed on a second side of the base. The first side is opposite the second side.

According to some embodiments, the base has a first engaging groove and a second engaging groove. When the movable part is located in the first position, the electrical conductive member is engaged with the first engaging groove. When the movable part is located in the second position, the electrical conductive member is engaged with the second engaging groove.

According to some embodiments, a first end of the first circuit member and a second end of the second circuit member are exposed from the first engaging groove. A third end of the third circuit member and a fourth end of the fourth circuit member are exposed from the second engaging groove. At least one of the first end, the second end, the third end and the fourth end has an arc structure configured to be in contact with the electrical conductive member.

According to some embodiments, the movable part further includes a main body. The electrical conductive member has a first conduction portion protruding from the main body along a second axis. The second axis is perpendicular to the first axis. The electrical conductive member has a second conduction portion protruding from the main body along the second axis.

According to some embodiments, the first circuit assembly includes a first circuit member and a second circuit member, which have a metal material. The second circuit assembly includes the second circuit member and a third circuit member, and the third circuit member has a metal material. When the movable part is located in the first position, the first conduction portion is electrically connected to the first circuit member and the second circuit member. When the movable part is located in the second position, the second conduction portion is electrically connected to the second circuit member and the third circuit member.

According to some embodiments, the optical element driving mechanism further includes at least one metal contacting portion disposed on the electrical conductive member or disposed on the first circuit member to the third circuit member. The metal contacting portion has a circular arc structure.

According to some embodiments, the fixed assembly includes a base. The base has a first engaging groove, a second engaging groove and a third engaging groove. The movable part has a rear engaging portion. When the movable part is located in the first position, the second conduction portion is engaged with the first engaging groove, and the rear engaging portion is engaged with the third engaging groove. When the movable part is located in the second position, the rear engaging portion is engaged with the second engaging groove.

According to some embodiments, the optical element driving mechanism further includes a reinforcement assembly, disposed in the base, configured to strengthen the overall mechanical strength of the optical element driving mechanism. A part of the first circuit assembly and the second circuit assembly is disposed in the base. The reinforcement assembly is electrically independent from the first circuit assembly and the second circuit assembly.

According to some embodiments, the first circuit assembly and the second circuit assembly are disposed in a first side wall of the base. The reinforcement assembly is disposed in a second side wall of the base. The first side wall is opposite the second side wall. The base has an inner side surface, and a part of the first circuit assembly and/or the second circuit assembly is exposed from the inner side surface.

The present disclosure provides an optical element driving mechanism, including a movable part, a fixed assembly, and a driving assembly. The movable part is configured to be connected to an optical element. The fixed assembly has a first opening, and the movable part is movable relative to the fixed assembly along a first axis. The driving assembly is configured to drive the movable part to move between a first position and a second position relative to the fixed assembly, so that the optical element selectively overlaps the first opening.

In some embodiments, the movable part may have an electrical conductive member, and the optical element driving mechanism correspondingly includes a first circuit assembly and a second circuit assembly. When the movable part is located in the first position relative to the fixed assembly, the electrical conductive member is electrically connected to the first circuit assembly, so that the external control circuit determines that the movable part is located in the first position. When the movable part is located in the second position relative to the fixed assembly, the electrical conductive member is electrically connected to the second circuit assembly, so that the external control circuit determines that the movable part is located in the second position.

Based on such a structural configuration, the optical element driving mechanism does not need to have any position sensing components (such as a Hall sensor and a Hall magnet), and the external control circuit can determine that the movable part is located in the first position or the second position. Therefore, not only can the position of the movable part be accurately sensed, but also the purpose of reducing manufacturing cost and miniaturization can be achieved.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
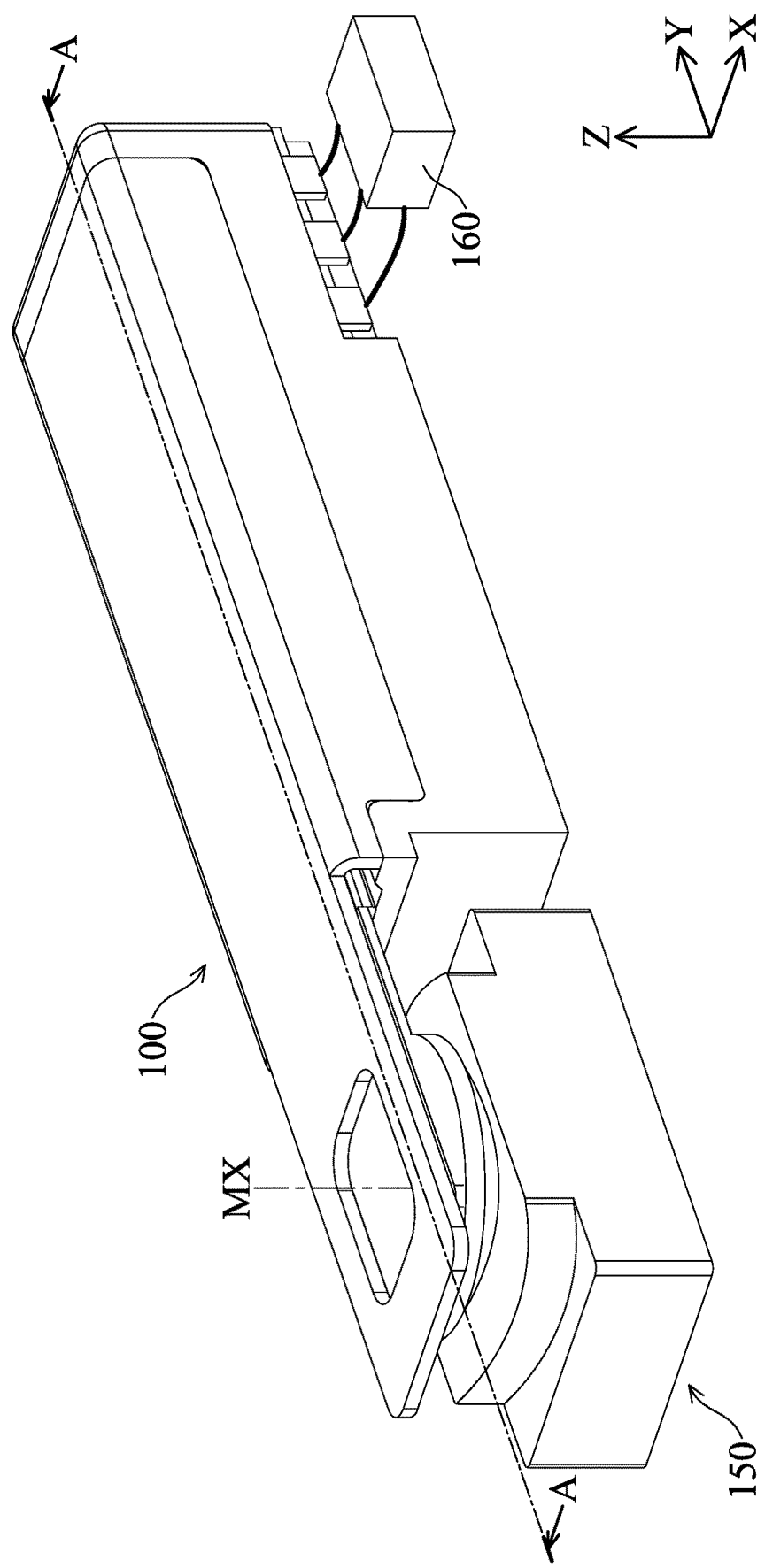
FIG. 1 shows a schematic diagram of an optical element driving mechanism 100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
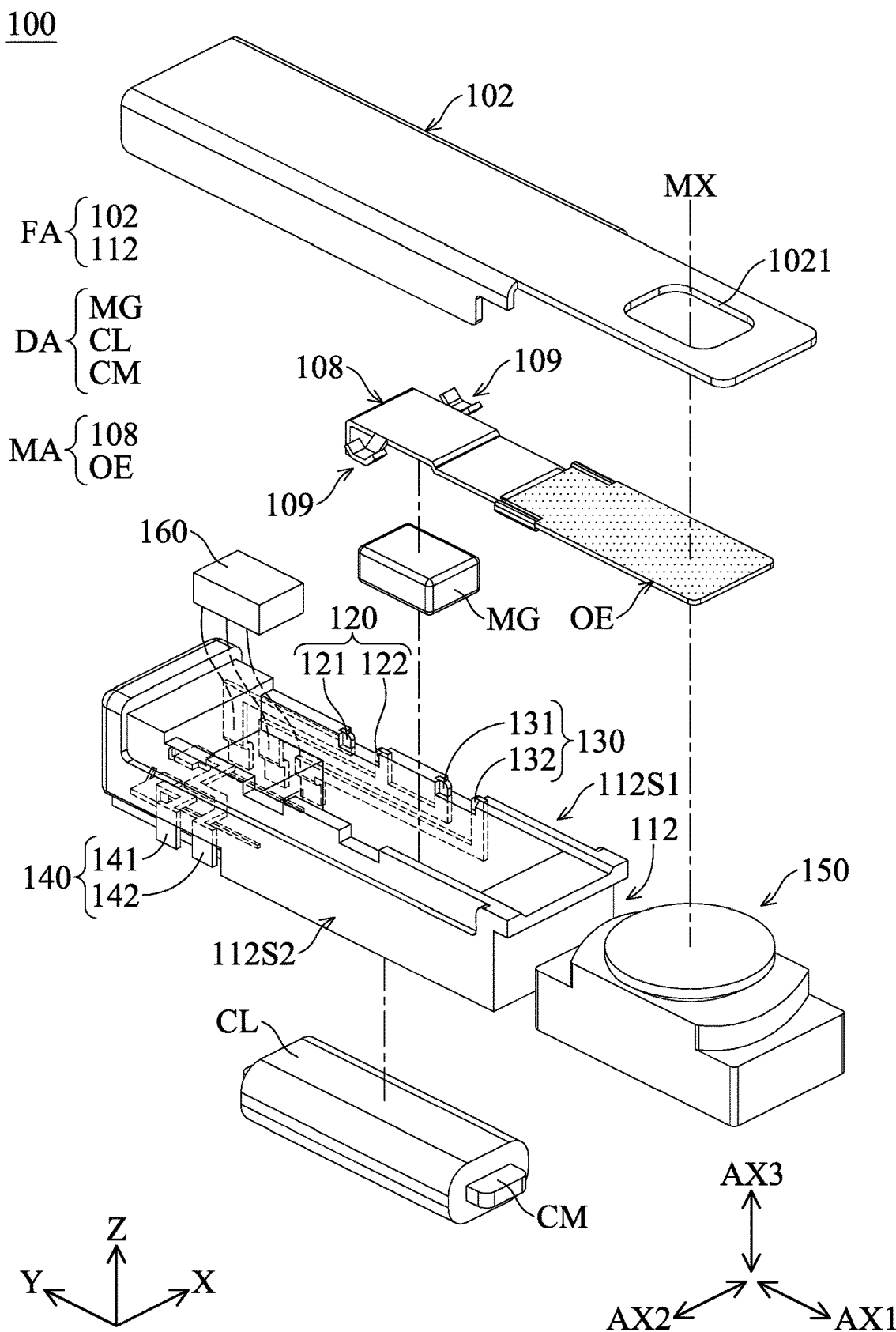
FIG. 2 shows an exploded diagram of the optical element driving mechanism 100 according to the embodiment of the present disclosure.
Figure 3:
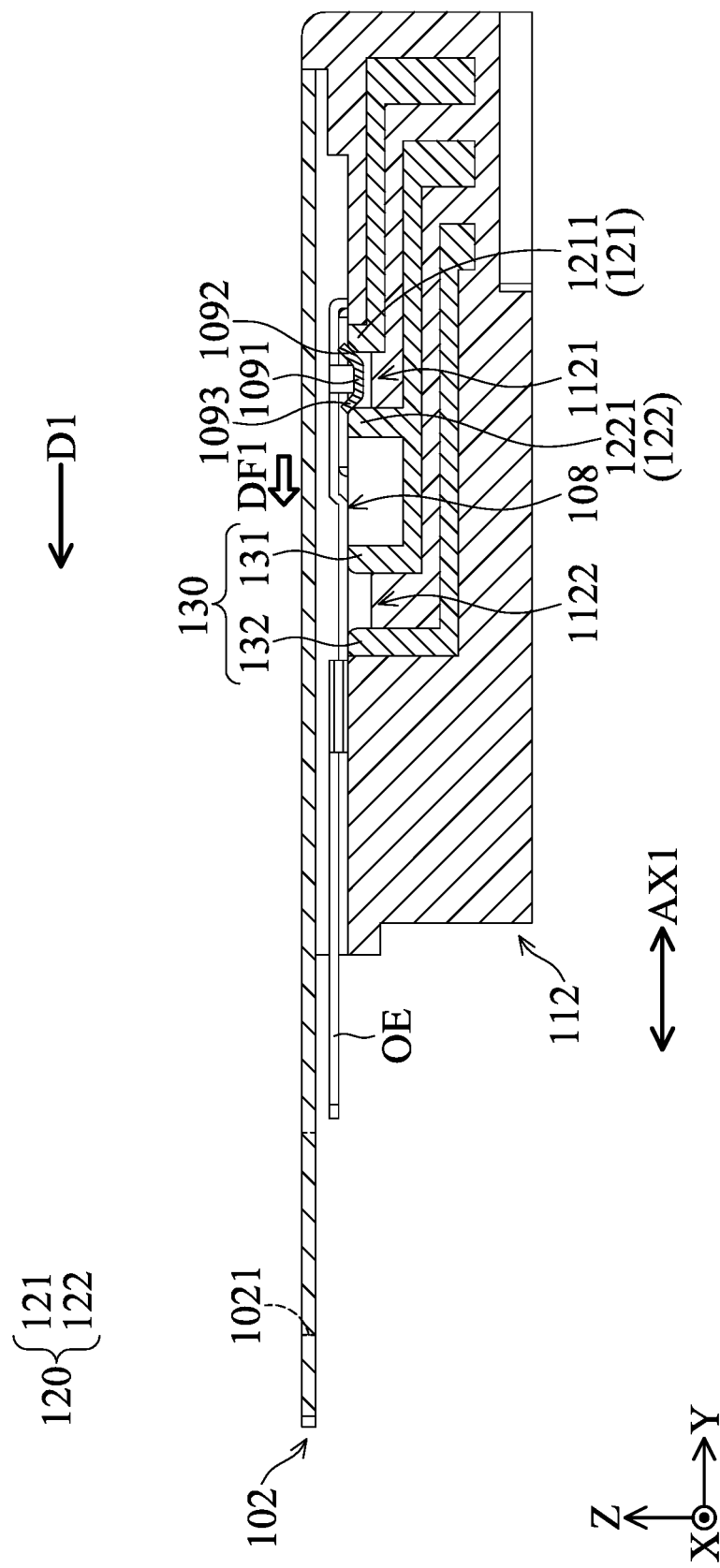
FIG. 3 shows a cross-sectional view of the optical element driving mechanism 100 along line A-A in FIG. 1 according to the embodiment of the present disclosure.

Please refer to FIG. 1 to FIG. 3. FIG. 1 shows a schematic diagram of an optical element driving mechanism 100 according to an embodiment of the present disclosure, FIG. 2 shows an exploded diagram of the optical element driving mechanism 100 according to the embodiment of the present disclosure, and FIG. 3 shows a cross-sectional view of the optical element driving mechanism 100 along line A-A in FIG. 1 according to the embodiment of the present disclosure. The optical element driving mechanism 100 can be an optical camera system and can be configured to hold and drive an optical element. The optical element driving mechanism 100 can be installed in different electronic devices or portable electronic devices, such as a smartphone, for allowing a user to perform the image capturing function.

In this embodiment, the optical element driving mechanism 100 may include a fixed assembly FA, a movable assembly MA, and a driving assembly DA. The movable assembly MA is movably connected to the fixed assembly FA. The driving assembly DA is configured to drive the movable assembly MA to move relative to the fixed assembly FA.

In this embodiment, as shown in FIG. 2, the fixed assembly FA includes an covering body 102 and a base 112. The movable assembly MA may include a movable part 108 and an optical element OE. In this embodiment, the optical element OE can be used as a light-shielding film or a shutter, but it is not limited thereto. In other embodiments, the optical element OE can also be used as a filter or aperture, and so on.

In this embodiment, the optical element OE is detachably connected to the movable part 108, but it is not limited thereto. For example, in other embodiments, the optical element OE can be connected to the movable part 108 by insert molding technology, but it is not limited thereto.

The covering body 102 is fixedly disposed on the base 112, the covering body 102 can be combined with the base 112 to cooperatively accommodate the movable assembly MA and the driving assembly DA, and the movable part 108 is movable relative to the fixed assembly FA.

As shown in FIG. 2, the aforementioned covering body 102 has a first opening 1021, and the base 112 accommodate an photosensitive module 150 (an optical module). An external light can travel along a main axis MX to pass through the first opening 1021 and to be received by the aforementioned photosensitive module 150 so as to generate a digital image signal.

Figure 4:
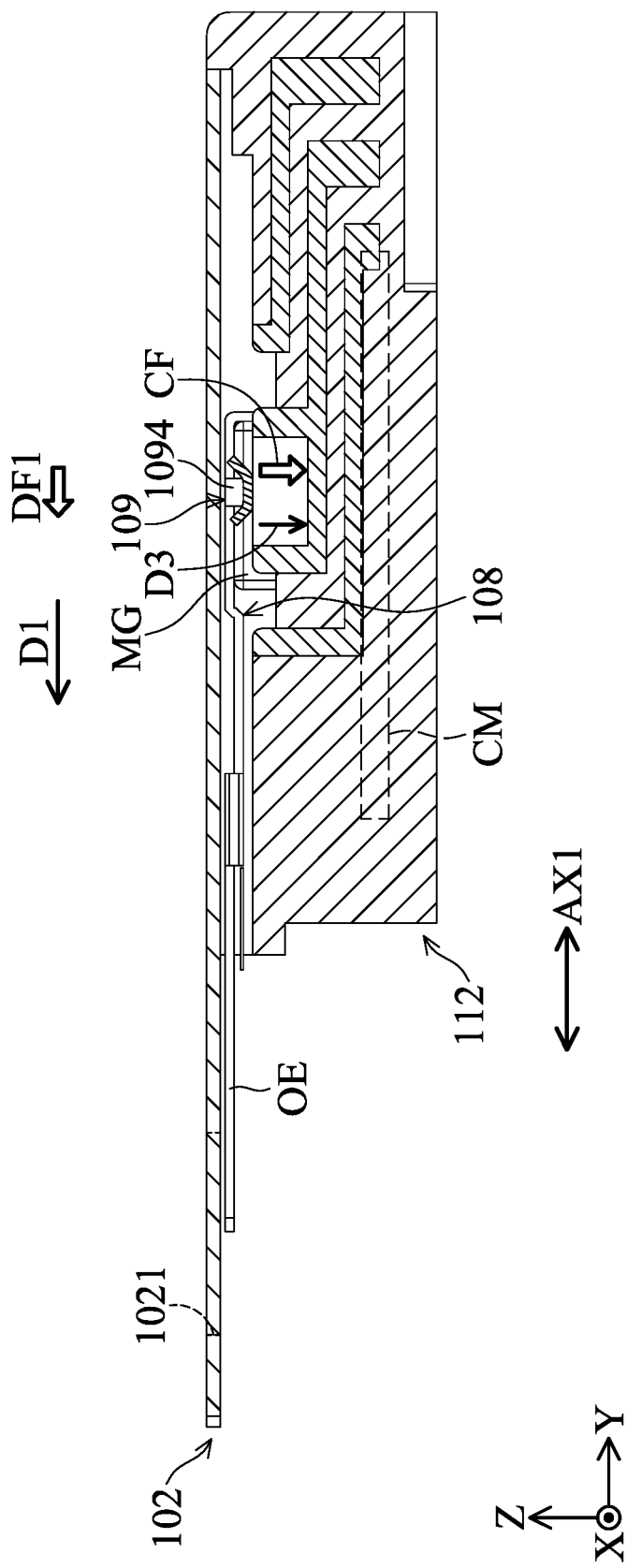
FIG. 4 and FIG. 5 are cross-sectional views of the movable part 108 moving to different positions according to an embodiment of the present disclosure.
Figure 5:
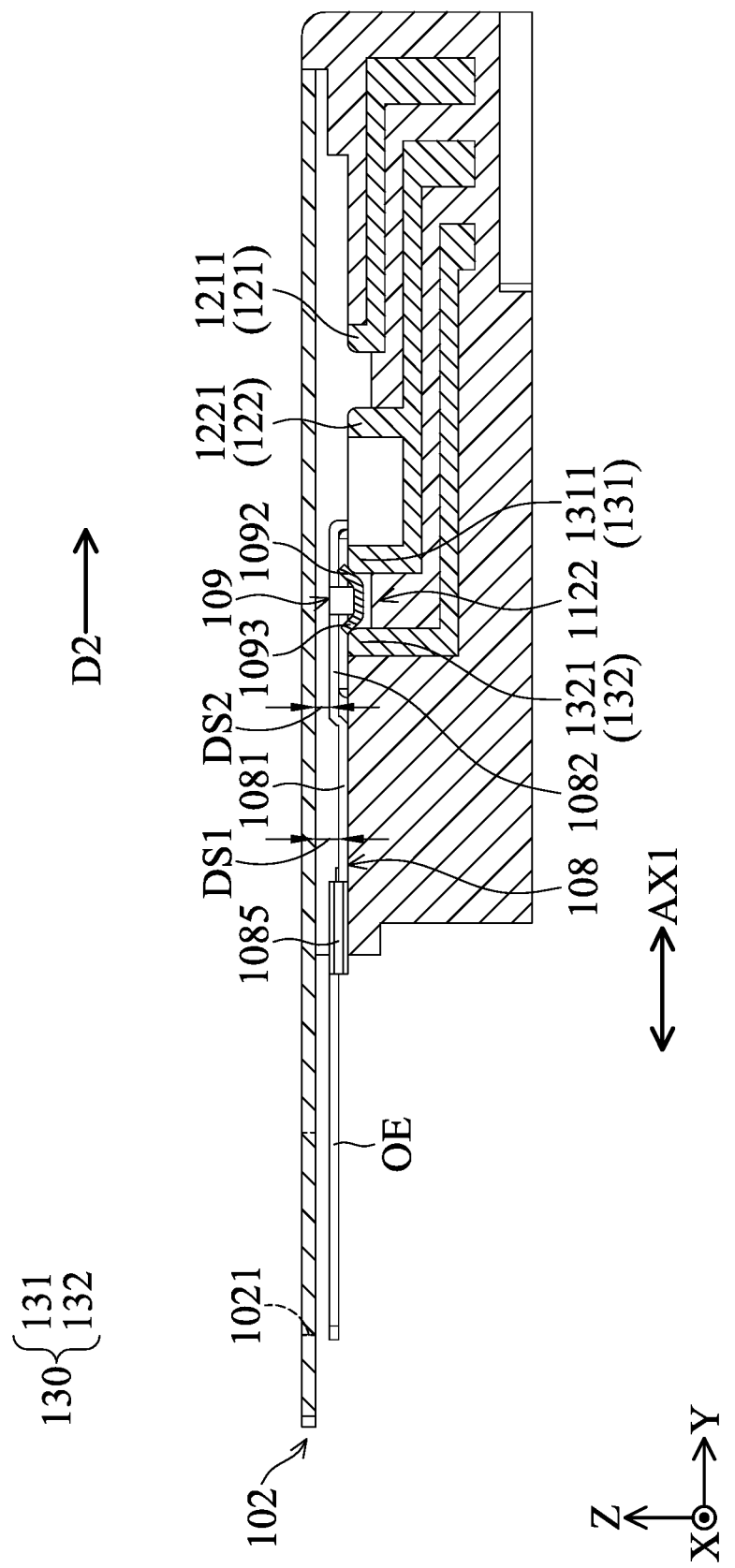
Figure 6:
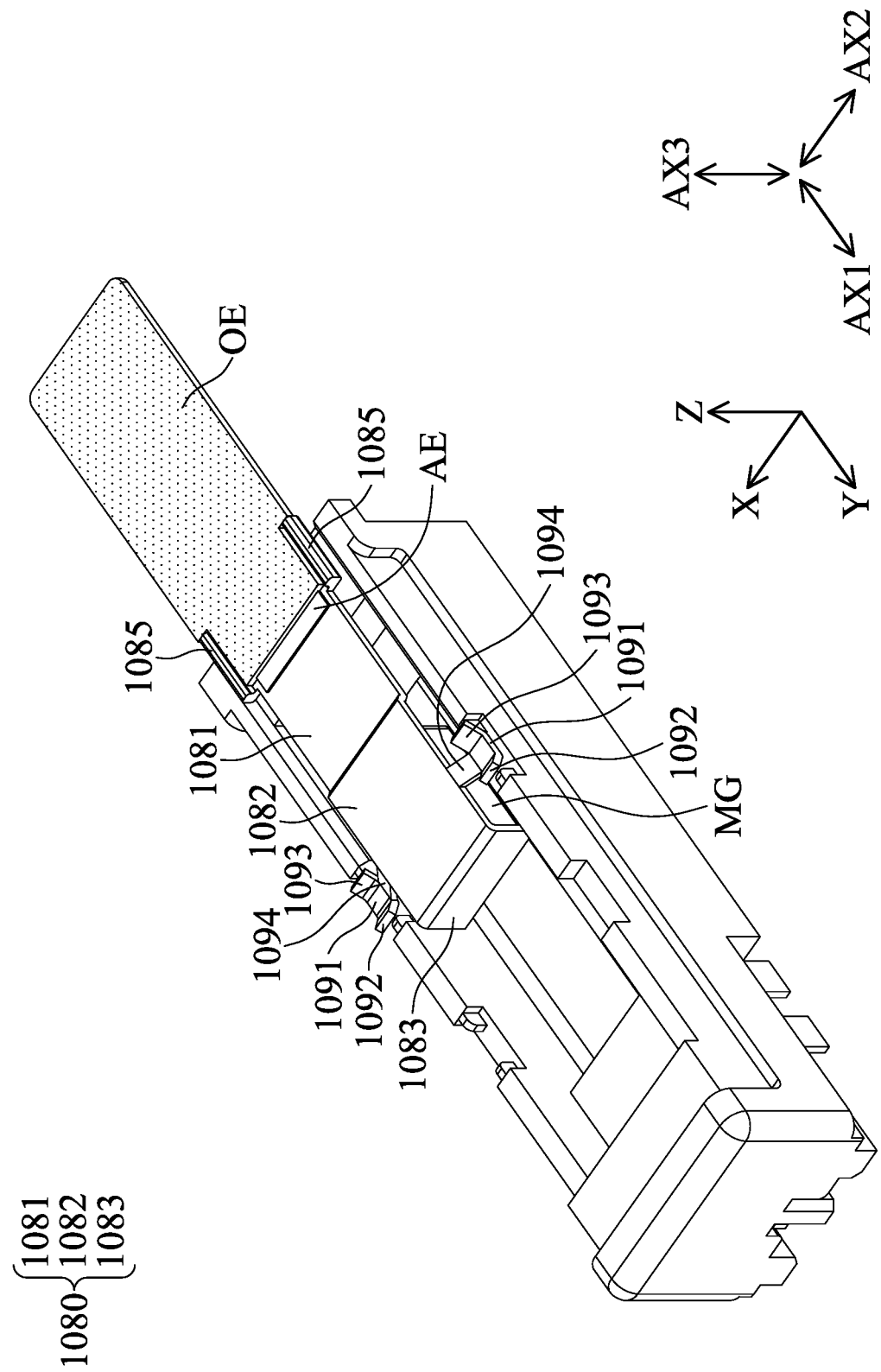
FIG. 6 is a perspective view of a partial structure of the optical element driving mechanism 100 in another view according to an embodiment of the present disclosure.

Please refer to FIG. 1 to FIG. 6. FIG. 4 and FIG. 5 are cross-sectional views of the movable part 108 moving to different positions according to an embodiment of the present disclosure, and FIG. 6 is a perspective view of a partial structure of the optical element driving mechanism 100 in another view according to an embodiment of the present disclosure.

In this embodiment, the driving assembly DA is configured to drive the movable part 108 relative to the fixed assembly FA to move along a first axis AX1 (the Y-axis) between a first position (FIG. 3) and a second position (No. 5), so that the optical element OE selectively overlaps the first opening 1021. For example, the movable part 108 can move to the second position along the Y-axis to shield the first opening 1021, as shown in FIG. 1 and FIG. 5.

The driving assembly DA includes a driving coil CL, a magnetically conductive element CM and a magnetic element MG. The magnetic element MG corresponds to the driving coil CL, and the magnetically conductive element CM corresponds to the driving coil CL. For example, the driving coil CL surrounds the magnetically conductive element CM. The magnetically conductive element CM has a plate-shaped structure, and the magnetically conductive element CM is parallel to the first axis AX1.

As shown in FIG. 1 to FIG. 3, the optical element driving mechanism 100 further includes a first circuit assembly 120 and a second circuit assembly 130 configured to be electrically connected to an external control circuit 160. Furthermore, the movable part 108 may have a magnetically conductive material and include at least one electrical conductive member 109 which is configured to be selectively electrically connected to the first circuit assembly 120 or the second circuit assembly 130. In this embodiment, the movable part 108 may have two electrical conductive members 109, which are symmetrical relative to the first axis AX1.

When the movable part 108 is located in the first position in FIG. 3 relative to the fixed assembly FA, the electrical conductive member 109 is configured to be electrically connected to the first circuit assembly 120, so that the external control circuit 160 determines that the movable part 108 is located in the first position. When the movable part 108 is located in the second position in FIG. 5 relative to the fixed assembly FA, the electrical conductive member 109 is configured to be electrically connected to the second circuit assembly 130, so that the external control circuit 160 determines that the movable part 108 is located in the second position.

Specifically, as shown in FIG. 3 and FIG. 6, the electrical conductive member 109 includes a base portion 1091, two side portions 1092, 1093 and a cantilever section 1094, each of which has a plate-shaped structure. The two side portions 1092 and 1093 are connected to opposite sides of the base portion 1091, and the extending direction of the two side portions 1092 and 1093 is different from the extending direction of the base portion 1091.

Furthermore, the movable part 108 has a main body 1080, and the base portion 1091 is connected to the main body 1080 of the movable part 108 through the cantilever section 1094. It is worth noting that the main body 1080 and the electrical conductive member 109 are integrally formed in one piece. For example, the electrical conductive member 109 is extended from the main body 1080 and formed by a punching process.

As shown in FIG. 3, when viewed along a second axis AX2 (the X-axis) perpendicular to the first axis AX1, the included angle between the side portion 1092 and the base portion 1091 or between the side portion 1093 and the base portion 1091 is greater than 90 degrees. For example, the side portions 1092, 1093 and the base portion 1091 may form a U-shaped structure. Furthermore, as shown in FIG. 6, when viewed along the first axis AX1, the included angle between the main body 1080 and the cantilever section 1094 may be greater than 90 degrees.

As shown in FIG. 2 and FIG. 3, in this embodiment, the first circuit assembly 120 includes a first circuit member 121 and a second circuit member 122, which have a metal material. When the movable part 108 is located in the first position, the two side portions 1092 and 1093 are in contact with the first circuit member 121 and the second circuit member 122 respectively.

Furthermore, in this embodiment, the base 112 has a first engaging groove 1121. When the movable part 108 is located in the first position, the electrical conductive member 109 is engaged with the first engaging groove 1121. It is worth noting that a part of the first circuit member 121 and the second circuit member 122 are located in the first engaging groove 1121.

Specifically, a first end 1211 of the first circuit member 121 and a second end 1221 of the second circuit member 122 are exposed from the first engaging groove 1121. The first end 1211 and the second end 1221 are configured to contact the electrical conductive member 109 so that the electrical conductive member 109 can be engaged with the first engaging groove 1121 and be electrically connected to the first circuit assembly 120 at the same time.

When it is desired to move the movable part 108 from the first position in FIG. 3 to the second position in FIG. 5 to make the optical element OE shield the first opening 1021, the external control circuit 160 controls the driving assembly DA to drive the movable part 108 to move along the first axis AX1. Specifically, the driving coil CL and the magnetic element MG generate an electromagnetic driving force DF1, which is configured to drive the movable part 108, so that the electrical conductive member 109 can be disengaged from the first engaging groove 1121 to the position shown in FIG. 4. At this time, the electrical conductive member 109 is in contact with the base 112 and can continue to move in a first direction D1.

It should be noted that the cantilever section 1094 of the present disclosure has elasticity, and an attractive force CF (−Z-axis) is generated between the magnetic element MG and the magnetically conductive element CM to press down the movable part 108. Therefore, when the electrical conductive member 109 contacts the base 112 (FIG. 4), the movable part 108 is not in contact with the covering body 102, so that the movable part 108 can smoothly move in the first direction D1.

Next, as shown in FIG. 5, the second circuit assembly 130 includes a third circuit member 131 and a fourth circuit member 132, which have a metal material. It is worth noting that the second circuit member 122 is electrically connected to the third circuit member 131. For example, the second circuit member 122 and the third circuit member 131 are integrally formed.

When the movable part 108 is moved from the position in FIG. 4 to the second position in FIG. 5, the electromagnetic driving force DF1 and the attractive force CF drive the two side portions 1092, 1093 to respectively contact the third circuit member 131 and the fourth circuit member 132.

Similarly, the base 112 further includes a second engaging groove 1122. When the movable part 108 is located in the second position, the electrical conductive member 109 is engaged with the second engaging groove 1122, and a part of the third circuit member 131 and the fourth circuit member 132 are located in the second engaging groove 1122.

Specifically, a third end 1311 of the third circuit member 131 and a fourth end 1321 of the fourth circuit member 132 are exposed from the second engaging groove 1122. The third end 1311 and the fourth end 1321 are configured to be in contact with the electrical conductive member 109 so that the electrical conductive member 109 can be engaged with the second engaging groove 1122 and be electrically connected to the second circuit assembly 130 at the same time.

When the movable part 108 is located in the second position, the external control circuit 160 can determine that the first opening 1021 is shielded by the optical element OE according to the electronic signal of the third circuit member 131 and the fourth circuit member 132.

When it is desired to let the first opening 1021 not be shielded by the optical element OE, the driving assembly DA can generate the electromagnetic driving force DF1 to drive the movable part 108 and the optical element OE to move along a second direction D2 from the second position in FIG. 5 back to the first position in FIG. 3. The detailed operations are similar to the description above, and thus are not repeated herein.

In addition, in some embodiments of the present disclosure, as shown in FIG. 3 to FIG. 5, at least one of the first end 1211, the second end 1221, the third end 1311 and the fourth end 1321 has an arc structure, configured to be in contact with the electrical conductive member 109. Based on the design of the arc structure, the electrical conductive member 109 can be smoothly separated from the first engaging groove 1121 or the second engaging groove 1122.

Then, please continue to refer to FIG. 6. In this embodiment, the main body 1080 includes a front side portion 1081, a middle portion 1082 and a rear side portion 1083, and the middle portion 1082 is connected between the front side portion 1081 and the rear side portion 1083. The front side portion 1081 has two clamping structures 1085 configured to clamp the optical element OE. For example, the optical element OE is made of light-absorbing plastic material, but it not limited thereto. In addition, in this embodiment, the optical element OE can be affixed to the movable part 108 by an adhesive element AE (such as glue).

As shown in FIG. 5 and FIG. 6, there is a stage difference between the front side portion 1081 and the middle portion 1082 along a third axis AX3 (the Z-axis), and the third axis AX3 is perpendicular to the first axis AX1 and the second axis AX2. Specifically, the shortest distance DS1 between the front side portion 1081 and the covering body 102 of the fixed assembly FA is greater than the shortest distance DS2 between the middle portion 1082 and the covering body 102 of the fixed assembly FA. Based on this structural design, the front side portion 1081 can hold the optical element OE without contacting the covering body 102.

Furthermore, in this embodiment, the extending directions of the rear side portion 1083 and the middle portion 1082 are different. When viewed along the second axis AX2, the angle between the rear side portion 1083 and the middle portion 1082 is between 85 degrees and 95 degrees. For example, the angle between the rear side portion 1083 and the middle portion 1082 may be 90 degrees. Based on this structural design, the magnetic element MG can be stably affixed to the middle portion 1082 and the rear side portion 1083.

Please return FIG. 2. In this embodiment, the optical element driving mechanism 100 may further include a third circuit assembly 140 configured to be electrically connected to the driving assembly DA. Specifically, the third circuit assembly 140 includes a fifth circuit member 141 and a sixth circuit member 142, which are configured to be electrically connected to the driving coil CL.

A part of the first circuit assembly 120, the second circuit assembly 130 and the third circuit assembly 140 is disposed in the base 112 by insert molding technology, and the third circuit assembly 140 is electrically independent from the first circuit assembly 120 and the second circuit assembly 130.

As shown in FIG. 2, the first circuit assembly 120 and the second circuit assembly 130 are disposed on a first side 112S1 of the base 112, the third circuit assembly 140 is disposed on a second side 112S2 of the base 112, and the first side 112S1 is opposite to the second side 112S2. Based on this structural configuration, the space of the base 112 can be effectively utilized to achieve the overall miniaturization of the optical element driving mechanism 100.

Figure 7:
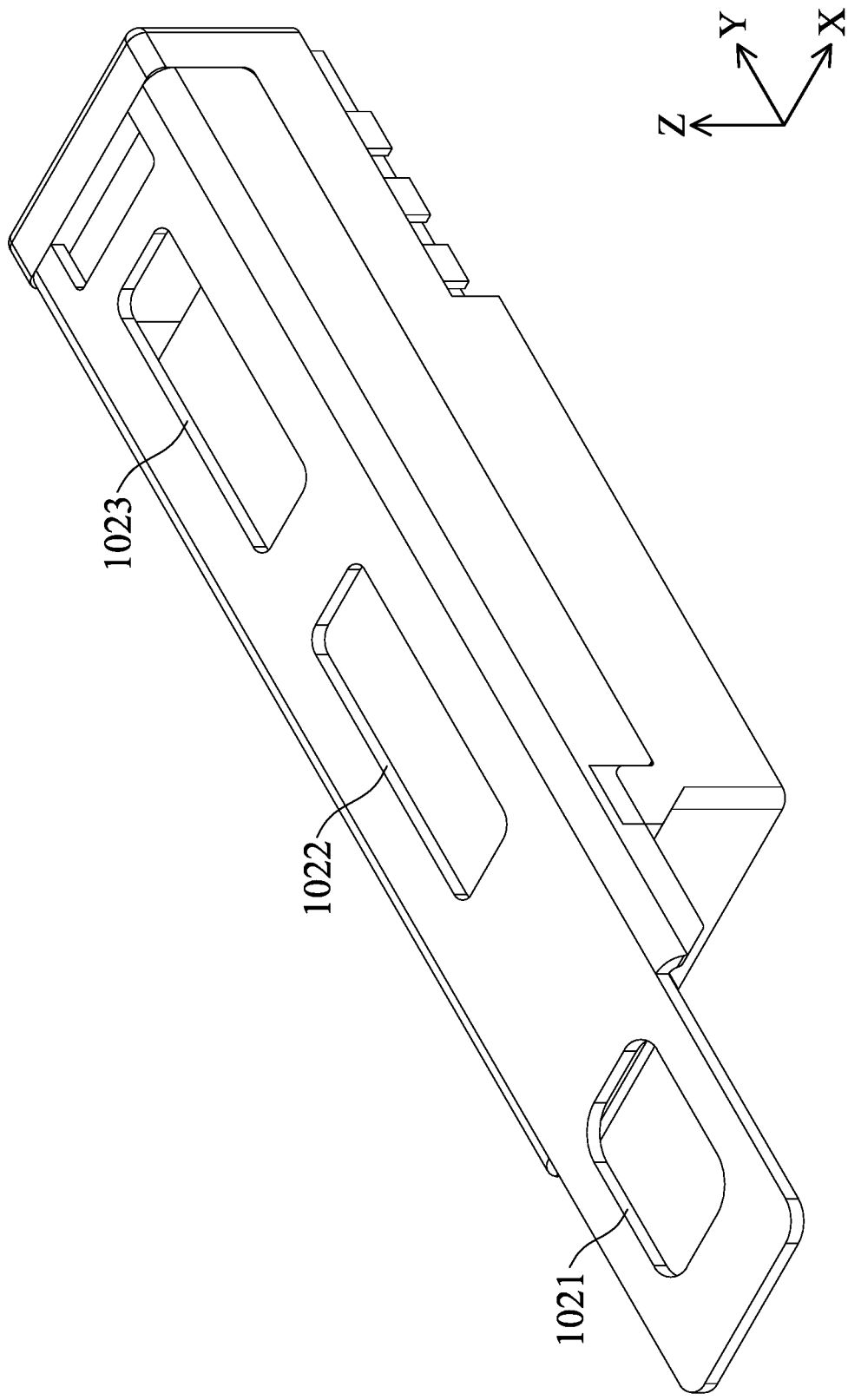
FIG. 7 is a perspective view of an optical element driving mechanism 100A according to another embodiment of the present disclosure.
Figure 8:
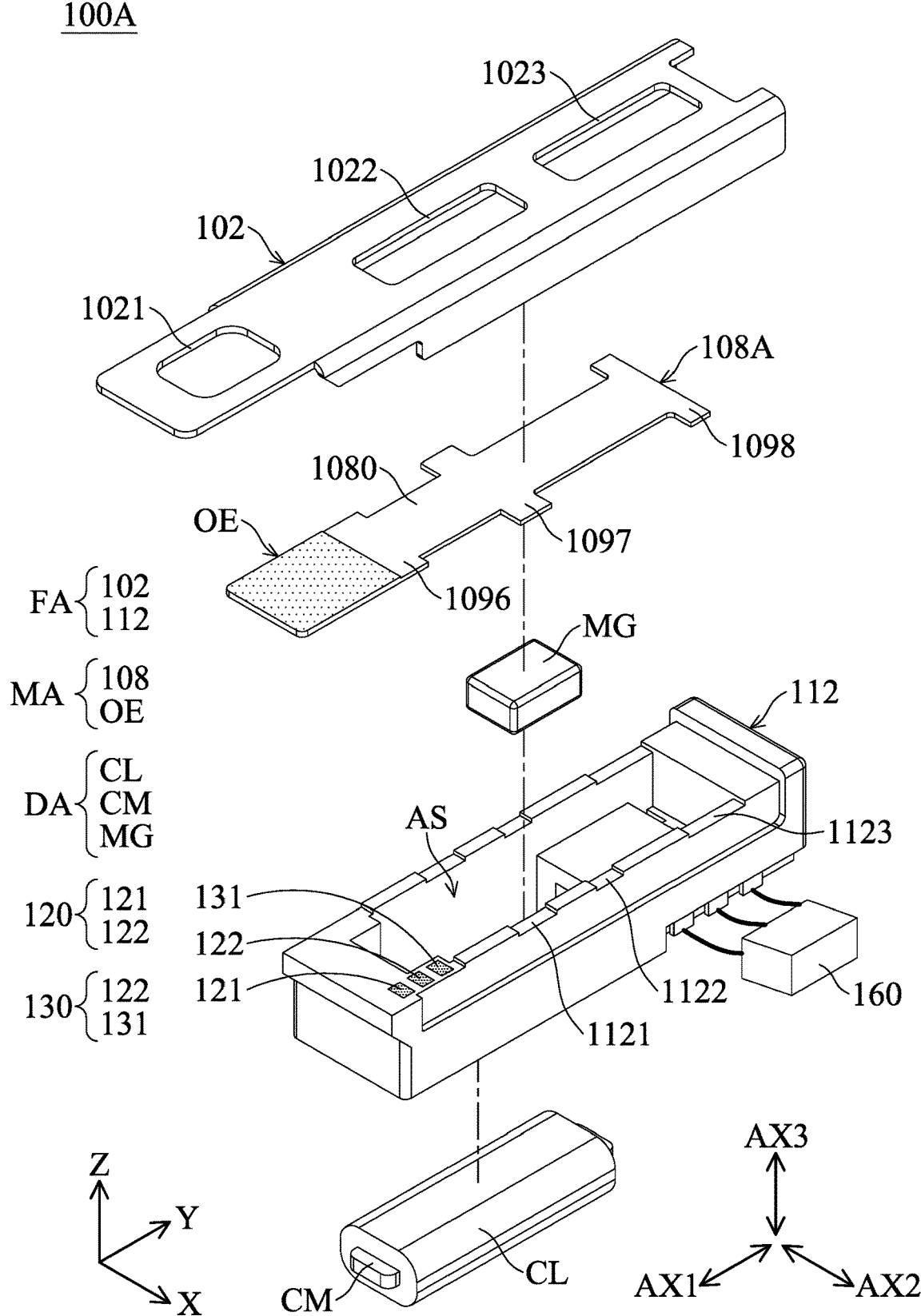
FIG. 8 is an exploded diagram of the optical element driving mechanism 100A according to another embodiment of the present disclosure.
Figure 9:
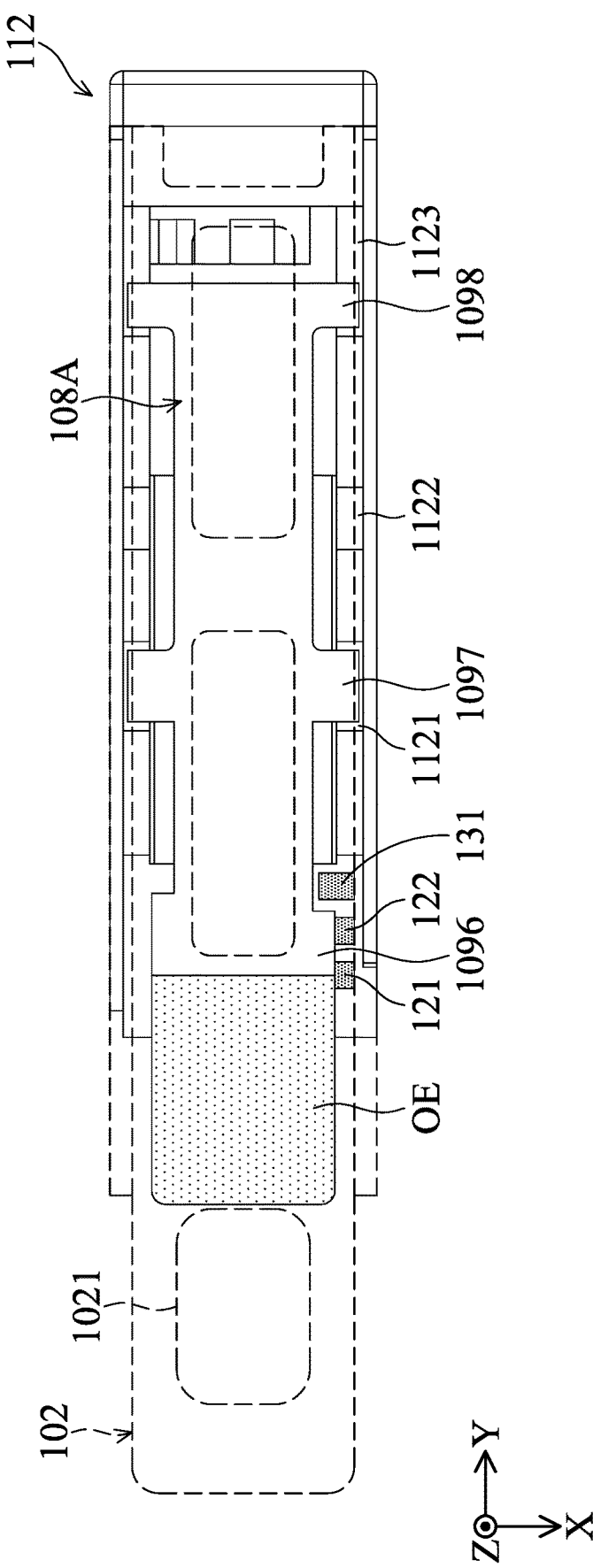
FIG. 9 is a top view of the movable part 108A located in the first position according to another embodiment of the present disclosure.
Figure 10:
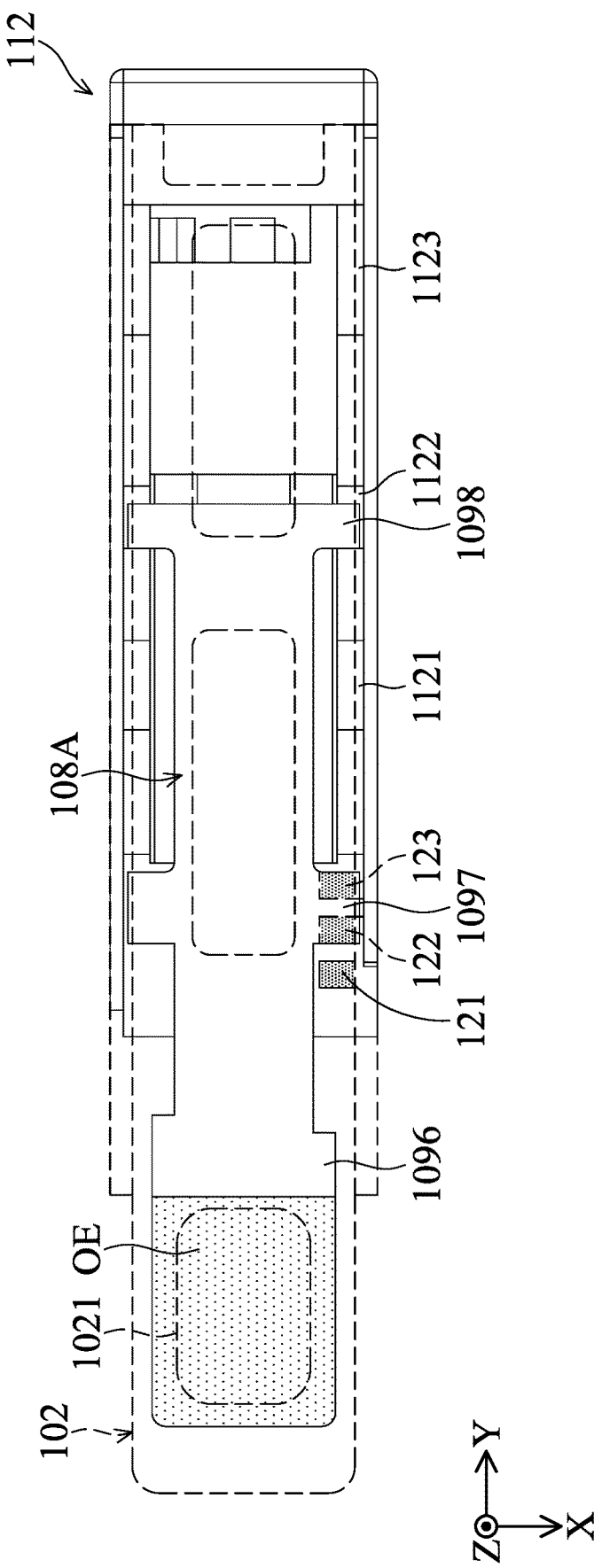
FIG. 10 is a top view of the movable part 108A located in the second position according to another embodiment of the present disclosure.

Please refer to FIG. 7 to FIG. 10. FIG. 7 is a perspective view of an optical element driving mechanism 100A according to another embodiment of the present disclosure, FIG. 8 is an exploded diagram of the optical element driving mechanism 100A according to another embodiment of the present disclosure. FIG. 9 is a top view of the movable part 108A located in the first position according to another embodiment of the present disclosure, and FIG. 10 is a top view of the movable part 108A located in the second position according to another embodiment of the present disclosure.

Similar to the previous embodiment, the optical element driving mechanism 100A includes the driving assembly DA configured to drive the movable part 108A to move between the first position and the second position. The magnetic element MG is fixedly disposed on the bottom of the movable part 108A, and the driving coil CL and the magnetically conductive element CM are disposed in an accommodating space AS of the base 112.

Similar to the previous embodiments, the covering body 102 may include the first opening 1021. Furthermore, the covering body 102 may further include a second opening 1022 and a third opening 1023. The configuration of the second opening 1022 and the third opening 1023 can increase the overall heat dissipation efficiency of the optical element driving mechanism 100A.

In this embodiment, the electrical conductive member 109 may have a first conduction portion 1096 protruding from the main body 1080 along the second axis AX2. The electrical conductive member 109 may further have a second conduction portion 1097 protruding from the main body 1080 along the second axis AX2. The first conduction portion 1096 and the second conduction portion 1097 may be conductive protrusions, for example. In addition, the movable part 108A further has a rear engaging portion 1098 protruding from the main body 1080 along the second axis AX2.

Similarly, in this embodiment, the first circuit assembly 120 includes a first circuit member 121 and a second circuit member 122, which have a metal material. The second circuit assembly 130 includes the second circuit member 122 and a third circuit member 131, and the third circuit member 131 has a metal material. The first circuit member, the second circuit member 122 and the third circuit member 131 are configured to be electrically connected to the aforementioned external control circuit 160.

In addition, the base 112 may have a first engaging groove 1121, a second engaging groove 1122, and a third engaging groove 1123, correspondingly. As shown in FIG. 9, when the movable part 108A is located in the first position, the first conduction portion 1096 is electrically connected to the first circuit member 121 and the second circuit member 122, and the external control circuit 160 can accordingly determine that the movable part 108A is located in the first position.

Furthermore, when the movable part 108A is located in the first position, the second conduction portion 1097 is engaged with the first engaging groove 1121, and the rear engaging portion 1098 is engaged with the third engaging groove 1123, so that the movable part 108A is positioned in the first position.

Furthermore, as shown in FIG. 10, when the movable part 108 is located in the second position, the second conduction portion 1097 is electrically connected to the second circuit member 122 and the third circuit member 131, and the external control circuit 160 can accordingly determine that the movable part 108A is located in the second position. In addition, when the movable part 108A is located in the second position, the rear engaging portion 1098 is engaged with the second engaging groove 1122, so that the movable part 108A is positioned in the second position.

Figure 11:
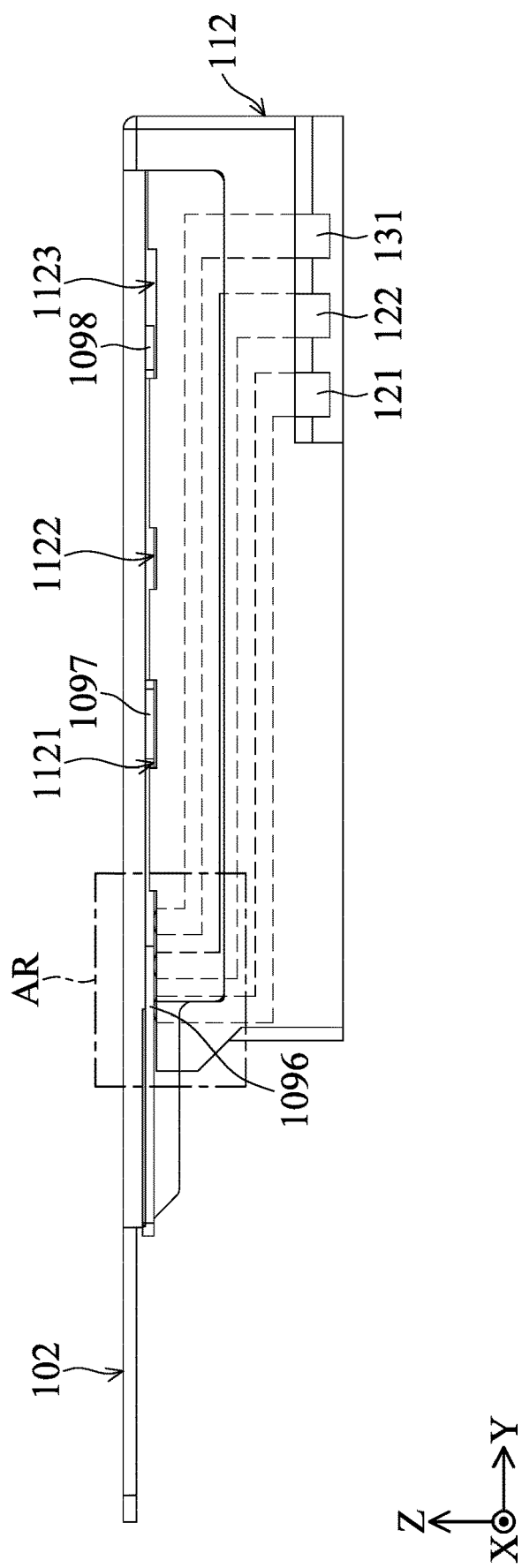
FIG. 11 is a side view of the optical element driving mechanism 100A according to another embodiment of the present disclosure.
Figure 11A:
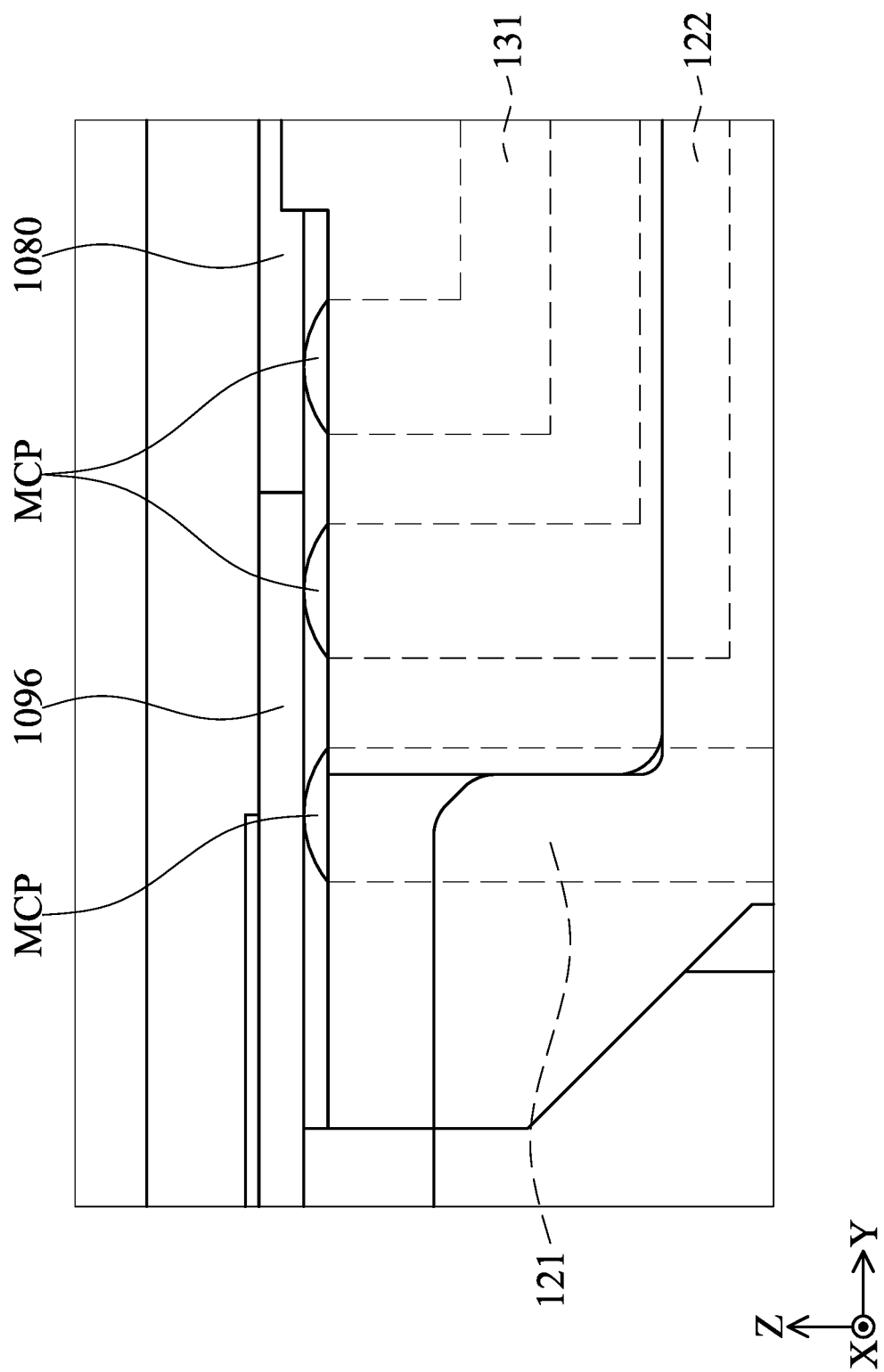
FIG. 11A is an enlarged view of the optical element driving mechanism 100A in the area AR in FIG. 11 according to another embodiment of the present disclosure.

Next, please refer to FIG. 11 and FIG. 11A. FIG. 11 is a side view of the optical element driving mechanism 100A according to another embodiment of the present disclosure, and FIG. 11A is an enlarged view of the optical element driving mechanism 100A in the area AR in FIG. 11 according to another embodiment of the present disclosure. In this embodiment, the optical element driving mechanism 100A further includes at least one metal contacting portion MCP disposed on the first circuit member 121 to the third circuit member 131.

As shown in FIG. 11, the metal contacting portion MCP has a circular arc structure, and the metal contacting portion MCP and the corresponding circuit member are integrally formed. Based on the structural design of the metal contacting portion MCP, it can be ensured that the first conduction portion 1096 is electrically connected to the first circuit assembly, and the second conduction portion 1097 is electrically connected to the second circuit assembly 130.

It should be noted that, in other embodiments, the metal contacting portion MCP may be disposed on the bottom of the first conduction portion 1096 and the second conduction portion 1097, and the disposition position of the metal contacting portion MCP depends on the actual design requirements.

Figure 12:
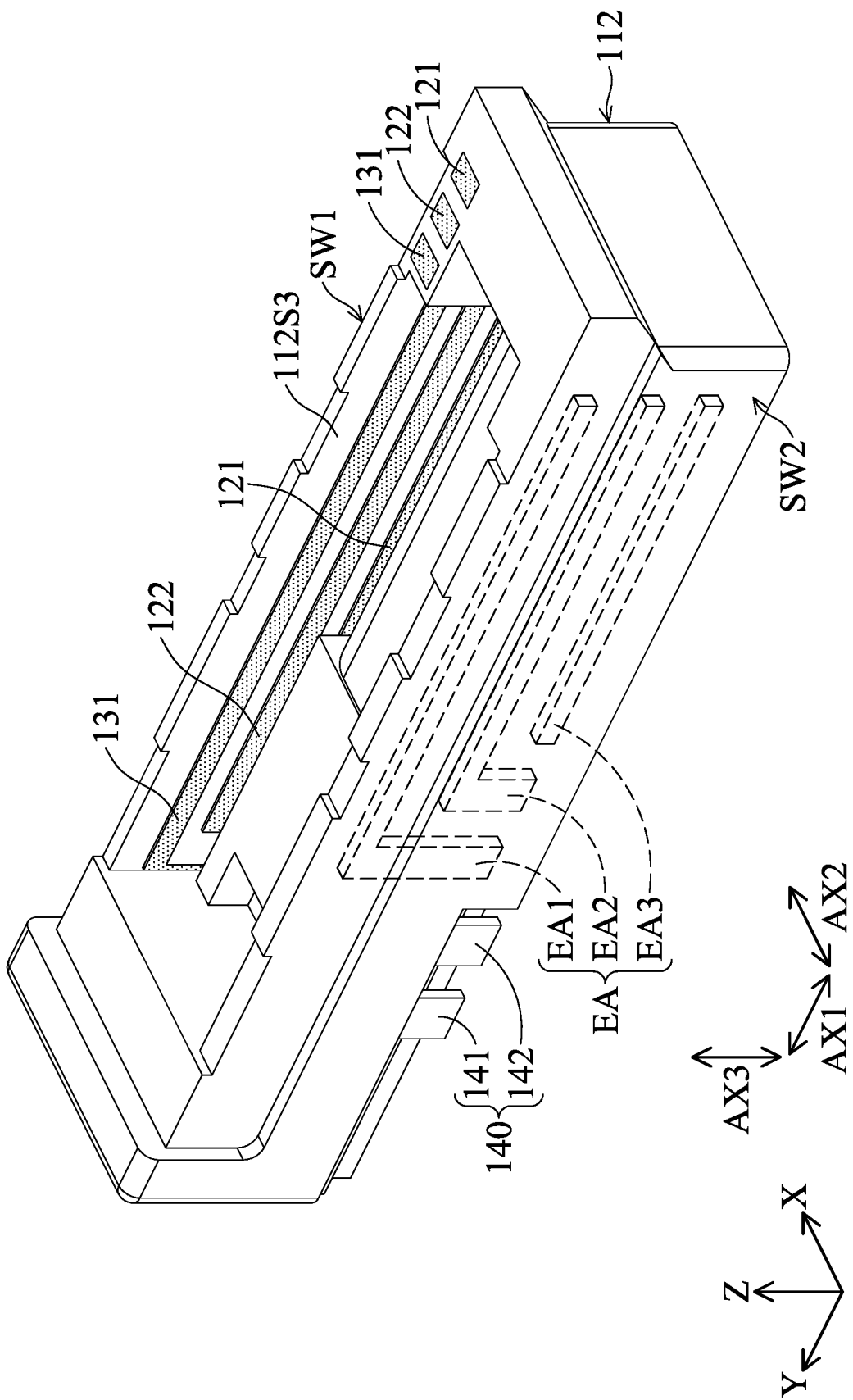
FIG. 12 is a perspective view of a partial structure of the optical element driving mechanism 100A according to another embodiment of the present disclosure.

Next, please refer to FIG. 12, which is a perspective view of a partial structure of the optical element driving mechanism 100A according to another embodiment of the present disclosure. As shown in FIG. 12, the optical element driving mechanism 100A further includes a reinforcement assembly EA which is disposed in the base 112 and configured to strengthen the overall mechanical strength of the optical element driving mechanism 100A. For example, the reinforcement assembly EA includes a first reinforcement member EA1, a second reinforcement member EA2 and a third reinforcement member EA3, which are disposed in the base 112 and located in a second side wall SW2 of the base 112.

A part of the first circuit assembly 120 and the second circuit assembly 130 is disposed in the base 112, and the first circuit assembly 120 and the second circuit assembly 130 are disposed in a first side wall SW1 of the base 112. The first side wall SW1 is opposite to the second side wall SW2.

The reinforcement assembly EA, the first circuit assembly 120, and the second circuit assembly 130 may have the same material, such as metal material. It is worth noting that the reinforcement assembly EA is electrically independent from the first circuit assembly 120, the second circuit assembly 130 and the third circuit assembly 140.

In addition, as shown in FIG. 12, in this embodiment, the base 112 has an inner side surface 112S3, and a part of the first circuit assembly 120 and/or the second circuit assembly 130 is exposed from the inner side surface 112S3. Based on this structural design, the thickness of the first side wall SW1 along the second axis AX2 (the X-axis) can be reduced to achieve the purpose of miniaturizing the optical element driving mechanism 100A.

In conclusion, the present disclosure provides an optical element driving mechanism, including a movable part, a fixed assembly, and a driving assembly. The movable part is configured to be connected to an optical element. The fixed assembly has a first opening, and the movable part is movable relative to the fixed assembly along a first axis. The driving assembly is configured to drive the movable part to move between a first position and a second position relative to the fixed assembly, so that the optical element selectively overlaps the first opening.

In some embodiments, the movable part 108 may have an electrical conductive member 109, and the optical element driving mechanism 100 correspondingly includes a first circuit assembly 120 and a second circuit assembly 130. When the movable part 108 is located in the first position relative to the fixed assembly FA, the electrical conductive member 109 is electrically connected to the first circuit assembly 120, so that the external control circuit 160 determines that the movable part 108 is located in the first position. When the movable part 108 is located in the second position relative to the fixed assembly FA, the electrical conductive member 109 is electrically connected to the second circuit assembly 130, so that the external control circuit 160 determines that the movable part 108 is located in the second position.

Based on such a structural configuration, the optical element driving mechanism 100 does not need to have any position sensing components (such as a Hall sensor and a Hall magnet), and the external control circuit 160 can determine that the movable part 108 is located in the first position or the second position. Therefore, not only can the position of the movable part 108 be accurately sensed, but also the purpose of reducing manufacturing cost and miniaturization can be achieved.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
    a movable part, configured to be connected to an optical element;
    a fixed assembly, having a first opening, wherein the movable part is movable relative to the fixed assembly along a first axis; and
    a driving assembly, configured to drive the movable part to move between a first position and a second position relative to the fixed assembly, so that the optical element selectively overlaps the first opening;
    wherein the optical element driving mechanism further comprises a first circuit assembly configured to be electrically connected to an external control circuit,
    wherein the movable part has a magnetically conductive material and comprises an electrical conductive member, and
    when the movable part is located in the first position relative to the fixed assembly, the electrical conductive member is configured to be electrically connected to the first circuit assembly, so that the external control circuit determines that the movable part is located in the first position.

2. The optical element driving mechanism as claimed in claim 1, wherein the optical element driving mechanism further comprises a second circuit assembly configured to be electrically connected to the external control circuit; and when the movable part is located in the second position relative to the fixed assembly, the electrical conductive member is configured to be electrically connected to the second circuit assembly, so that the external control circuit determines that the movable part is located in the second position.

3. The optical element driving mechanism as claimed in claim 2, wherein the electrical conductive member comprises a base portion, two side portions and a cantilever section, each of which has a plate-shaped structure;

the two side portions are connected to opposite sides of the base portion;
an extending direction of the two side portions is different from an extending direction of the base portion;
the base portion is connected to a main body of the movable part by the cantilever section; and
the main body and the electrical conductive member are integrally formed as one piece.

4. The optical element driving mechanism as claimed in claim 3, wherein when viewed along a second axis perpendicular to the first axis, an angle between the side portion and the base portion is greater than 90 degrees; and when viewed along the first axis, an angle between the main body and the cantilever section is greater than 90 degrees.

5. The optical element driving mechanism as claimed in claim 4, wherein the first circuit assembly comprises a first circuit member and a second circuit member, which have a metal material; and when the movable part is located in the first position, the two side portions are respectively in contact with the first circuit member and the second circuit member.

6. The optical element driving mechanism as claimed in claim 5, wherein the second circuit assembly comprises a third circuit member and a fourth circuit member, which have a metal material;

when the movable part is located in the second position, the two side portions are respectively in contact with the third circuit member and the fourth circuit member; and
the second circuit member is electrically connected to the third circuit member.

7. The optical element driving mechanism as claimed in claim 6, wherein the main body comprises a front side portion, a middle portion and a rear side portion;

the middle portion is connected between the front side portion and the rear side portion; and
the front side portion has two clamping structures configured to clamp the optical element.

8. The optical element driving mechanism as claimed in claim 7, wherein there is a stage difference between the front side portion and the middle portion; and a shortest distance between the front side portion and the fixed assembly is greater than a shortest distance between the middle portion and the fixed assembly.

9. The optical element driving mechanism as claimed in claim 8, wherein an extending direction of the rear side portion is different from an extending direction of the middle portion;

when viewed along the second axis, an angle between the rear side portion and the middle portion is between 85 degrees and 95 degrees; and the driving assembly comprises a magnetic element which is affixed to the middle portion and the rear side portion.

10. The optical element driving mechanism as claimed in claim 6, wherein the fixed assembly comprises a base;

the optical element driving mechanism further comprises a third circuit assembly configured to be electrically connected to the driving assembly;
a part of the first circuit assembly, the second circuit assembly and the third circuit assembly is disposed in the base; and
the third circuit assembly is electrically independent of the first circuit assembly and the second circuit assembly.

11. The optical element driving mechanism as claimed in claim 10, wherein the first circuit assembly and the second circuit assembly are disposed on a first side of the base;

the third circuit assembly is disposed on a second side of the base; and
the first side is opposite the second side.

12. The optical element driving mechanism as claimed in claim 11, wherein the base has a first engaging groove and a second engaging groove;
when the movable part is located in the first position, the electrical conductive member is engaged with the first engaging groove; and
when the movable part is located in the second position, the electrical conductive member is engaged with the second engaging groove.

13. The optical element driving mechanism as claimed in claim 12, wherein a first end of the first circuit member and a second end of the second circuit member are exposed from the first engaging groove;

a third end of the third circuit member and a fourth end of the fourth circuit member are exposed from the second engaging groove; and
at least one of the first end, the second end, the third end and the fourth end has an arc structure configured to be in contact with the electrical conductive member.

14. The optical element driving mechanism as claimed in claim 2, wherein the movable part further includes a main body;

the electrical conductive member has a first conduction portion protruding from the main body along a second axis;
the second axis is perpendicular to the first axis; and
the electrical conductive member has a second conduction portion protruding from the main body along the second axis.

15. The optical element driving mechanism as claimed in claim 14, wherein the first circuit assembly comprise a first circuit member and a second circuit member, which have a metal material;

the second circuit assembly includes the second circuit member and a third circuit member, and the third circuit member has a metal material;
when the movable part is located in the first position, the first conduction portion is electrically connected to the first circuit member and the second circuit member; and
when the movable part is located in the second position, the second conduction portion is electrically connected to the second circuit member and the third circuit member.

16. The optical element driving mechanism as claimed in claim 15, wherein the optical element driving mechanism further comprises at least one metal contacting portion disposed on the electrical conductive member or disposed on the first circuit member to the third circuit member; and the metal contacting portion has a circular arc structure.

17. The optical element driving mechanism as claimed in claim 15, wherein the fixed assembly comprises a base;

the base has a first engaging groove, a second engaging groove and a third engaging groove;

the movable part has a rear engaging portion;

when the movable part is located in the first position, the second conduction portion is engaged with the first engaging groove, and the rear engaging portion is engaged with the third engaging groove; and when the movable part is located in the second position, the rear engaging portion is engaged with the second engaging groove.

18. The optical element driving mechanism as claimed in claim 17, wherein the optical element driving mechanism further comprises a reinforcement assembly, disposed in the base, configured to strengthen overall mechanical strength of the optical element driving mechanism;

a part of the first circuit assembly and the second circuit assembly is disposed in the base; and the reinforcement assembly is electrically independent from the first circuit assembly and the second circuit assembly.

19. The optical element driving mechanism as claimed in claim 18, wherein the first circuit assembly and the second circuit assembly are disposed in a first side wall of the base;

the reinforcement assembly is disposed in a second side wall of the base;

the first side wall is opposite the second side wall; and the base has an inner side surface, and a part of the first circuit assembly and/or the second circuit assembly is exposed from the inner side surface.

* * * * *